(12) United States Patent
Sung (10) Patent No.: US 11,140,151 B2
(45) Date of Patent: Oct. 5, 2021

(54) METHOD FOR PROVIDING MESSAGE HIDDEN SERVICES IN CHATTING WINDOWS

(71) Applicant: Jae Ho Sung, Seoul (KR)

(72) Inventor: Jae Ho Sung, Seoul (KR)

( * ) Notice: Subject to any disclaimer, the term of this patent is extended or adjusted under 35 U.S.C. 154(b) by 325 days.

(21) Appl. No.: 16/208,448

(22) Filed: Dec. 3, 2018

(65) Prior Publication Data

US 2019/0173869 A1 Jun. 6, 2019

(30) Foreign Application Priority Data

Dec. 5, 2017 (KR) .......................... 10-2017-0165543
Aug. 14, 2018 (KR) .......................... 10-2018-0094775

(51) Int. Cl.
| | | |
|---|---|---|
| H04L 29/06 | (2006.01) | |
| H04L 12/58 | (2006.01) | |
| H04W 4/14 | (2009.01) | |
| H04L 9/32 | (2006.01) | |
| H04M 1/72436 | (2021.01) | |

(52) U.S. Cl.
CPC .......... *H04L 63/083* (2013.01); *H04L 9/3226* (2013.01); *H04L 9/3231* (2013.01); *H04L 51/046* (2013.01); *H04M 1/72436* (2021.01); *H04W 4/14* (2013.01)

(58) Field of Classification Search
CPC ... H04L 63/083; H04L 9/3226; H04L 9/3231; H04L 51/046; H04M 1/72552; H04W 4/14
See application file for complete search history.

(56) References Cited

U.S. PATENT DOCUMENTS

| | | | | |
|---|---|---|---|---|
| 7,813,743 | B1* | 10/2010 | Loeb ....................... | H04L 51/20 455/456.3 |
| 2015/0012846 | A1* | 1/2015 | Xie ........................ | H04L 51/046 715/753 |
| 2015/0207926 | A1* | 7/2015 | Brown .............. | H04M 1/72566 455/414.1 |
| 2015/0319141 | A1* | 11/2015 | Jang ...................... | H04L 51/046 726/26 |

(Continued)

FOREIGN PATENT DOCUMENTS

| | | |
|---|---|---|
| KR | 10-0873798 B1 | 12/2008 |
| KR | 10-1332811 B1 | 11/2013 |

*Primary Examiner* — Kristine L Kincaid
*Assistant Examiner* — Alexander R Lapian
(74) *Attorney, Agent, or Firm* — Revolution IP, PLLC (57) ABSTRACT

A method for providing a message hidden service in a chatting window, including: A) confirming whether a received message is a message set as a hidden message from a transmitter when the message is received from a chatting server; (B) confirming whether the received message is set in a hidden setting mode from the receiver when the confirmed result is confirmed as the hidden message; (C) displaying the received hidden message on an independent position separately from a region of the display unit of the device by instructing the received message to be processed by a hidden message processing unit when the received message is the hidden message set by the transmitter and set in the hidden mode state set by the receiver, and (D) hiding the hidden message displayed on the display unit after a predetermined constant time.

13 Claims, 5 Drawing Sheets

(56) References Cited

U.S. PATENT DOCUMENTS

| | | | |
|---|---|---|---|
| 2015/0381575 A1* | 12/2015 | Bhargav-Spantzel | ........................ H04L 63/0861 713/168 |
| 2016/0294785 A1* | 10/2016 | Lim | .................... H04L 63/0428 |
| 2017/0336926 A1* | 11/2017 | Chaudhri | ................ H04L 51/04 |
| 2018/0146088 A1* | 5/2018 | Moshir | ............... H04L 63/0428 |
| 2018/0248698 A1* | 8/2018 | Kominar | ................. G06F 21/45 |
| 2019/0065777 A1* | 2/2019 | Ravuvari | ................ G06F 21/32 |
| 2019/0132438 A1* | 5/2019 | Loughran | ............... H04L 51/04 |

\* cited by examiner

METHOD FOR PROVIDING MESSAGE HIDDEN SERVICES IN CHATTING WINDOWS

TECHNICAL FIELD

The present invention relates to an apparatus and a method for providing a service of hiding a message received from a mobile communication terminal and more particularly, to a method for providing a service of hiding a message received through authentication of a receiver with respect to a hidden message agreed between a transmitter and a receiver of the message.

BACKGROUND ART

Recently, as the penetration rate of mobile communication terminals has rapidly increased, the mobile communication terminals have become necessaries of life of modern people. Such a mobile communication terminal performs not only calling and message transmitting/receiving functions but also a messenger function that has been available only in existing PCs.

Accordingly, the mobile communication terminal also includes a chatting application using an instant messaging service, thereby exchanging various information with friends in a chatting form. The chatting refers to a behavior in which two or more users in the network exchange texts in real time.

While the users exchange the texts therebetween through the chatting application to feel the enjoyment, but when texts representing personal chatting or feelings are exposed to others, the user feels a sense of privacy exposure. Accordingly, users should be careful about security so that the texts expressing personal chatting or feelings are not exposed to others.

To this end, the user endures inconveniences such as deleting a chatting window containing texts in which his/her private life is likely to be exposed, or setting a password to prevent the contents of his or her mobile communication terminal from being exposed to others.

However, it is troublesome to confirm the chatting contents later and confirm whether there is something that can expose the privacy of the person while exchanging chatting texts with each other through the chatting application. In addition, even if the chatting contents are to be confirmed next time, when the user deletes the contents due to the privacy exposure, the user can not confirm the contents again. As a result, there is a problem in that the user deletes the chatting contents in order not to expose his or her private life to others, resulting in not confirming the contents when the user needs the contents.

PRIOR ART DOCUMENT

Patent Document (Patent Document 1) Korean Patent Registration No. 10-0873798 (registered on Dec. 5, 2008)
(Patent Document 2) Korean Patent Registration No. 10-1332811 (registered on Nov. 19, 2013)

DISCLOSURE

Technical Problem

The present invention has been made to solve the above-mentioned problems, and an object of the present invention is to provide a service method for hiding a message received through authentication of a receiver with respect to a hidden message agreed between both a message transmitter and the receiver.

Another object of the present invention is to provide a method for providing a message hidden service in a chatting window which prevents his or her privacy life from being exposed to others by providing a hidden service for only texts whose own privacy is exposed among the texts exchanged with each other through a chatting application and exposing the remaining chatting texts.

Other objects of the present invention are not limited to the above-mentioned objects, and other objects not mentioned can be clearly understood by those skilled in the art from the following description.

Technical Solution

According to the present invention to accomplish the above objects, there is provided a method for providing a message hidden service in a chatting window comprising: (A) confirming whether a received message is a message set as a hidden message from a transmitter when the message is received from a chatting server; (B) confirming whether the received message is set in a hidden setting mode from the receiver when the confirmed result is confirmed as the hidden message; (C) displaying the received hidden message on an independent position separately from a region of the display unit of the device by instructing the received message to be processed by a hidden message processing unit when the received message is the hidden message set by the transmitter and set in the hidden mode state set by the receiver; and (D), wherein the hidden message displayed on the display unit in step (C) provides at least one of displaying the "hidden message" on the upper end of the message so that the receiver determines the hidden message, displaying a highlight on an edge of a speech bubble, displaying the inside of the speech bubble with different colors, and displaying blinking on the speech bubble, and when the received message is the hidden message set by the transmitter and the hidden mode setting is not confirmed by the receiver, the hidden message is processed as the general message and the received hidden message is displayed on the display unit of the device as the general message.

Preferably, the method may further include performing an authentication procedure by displaying a personal authentication confirmation window for performing unhiding by a personal authentication unit on the display unit when the unhiding of the hidden message is selected from the receiver; and selecting a message to be unhidden from the messages which have been hidden by an unhidden processing unit and displaying he hidden message on the display unit by unhiding the selected hidden message when the user authentication is confirmed through the authentication procedure.

Preferably, the authentication procedure may include displaying a password input window transparently on the display unit; and inputting a password by a user using a keyboard in a general message screen, wherein when the user inputs the password by using the keyboard while the password input window is displayed on the screen, the input password is not displayed on the screen.

Preferably, when the hidden message is displayed on the display unit, the hidden message may be displayed together with a date and a time received together with the message.

Preferably, the hidden message to be unhidden is configured by displaying only some of the hidden message on the display unit by unhiding the hidden message at a corresponding position when a region where the hidden message is positioned is selected from the messages displayed on the chatting window, and displaying all of the hidden message on the display unit by unhiding the hidden message of the transmitter when the transmitter displayed on the upper end of the chatting window is selected.

Preferably, in step (B), before the transmitter to transmit the hidden message transmits the hidden message, the transmitter may first transmit the hidden message transmission to the receiver and the receiver may approve the hidden message transmission received from the transmitter.

Preferably, in step (C), the hidden message or the unhidden message may be displayed on a separate window or an independent position separately from a region of the display unit where the general message is displayed.

Preferably, step (C) may include receiving a continuous hidden mode setting request during the hidden mode request and processing the reception as the continuous hiding, and collectively hiding until at least one of the transmitter and the receiver until performs the unhiding.

Preferably, the method for providing a message hidden service in a chatting window may further include forcibly setting, by the transmitter, a message hidden service setting; and selecting, by receiver, the forcibly set message transmitted by the transmitter to be received as the hidden message or not to be received as the hidden message.

Preferably, the method for providing a message hidden service in a chatting window may further include adding, by the transmitter, an identification function to a menu of a hidden message; and taking and transmitting a live picture as soon as other party confirms the hidden message when the receiver is waiting and transmitting live confirmation or a snapshot during the chatting.

According to another embodiment of the present invention, there is provided a method for providing a message hidden service in a chatting window comprising: (a) confirming whether a received message is a message set as a hidden message from a transmitter when the message is received from a chatting server; (b) confirming whether the received message is set in a hidden setting mode from the receiver when the confirmed result is confirmed as the hidden message; (c) displaying the hidden message received by the hidden message processing unit on the display unit of the device when the hidden message is set from the transmitter and the hidden setting mode is set from the receiver; (d) deleting the hidden message displayed on the display unit after a predetermined constant time; and (e) arranging the message displayed on the display unit by moving to a position parallel with a position where the hidden message is deleted after the hidden message.

Preferably, when the hidden message is displayed on the display unit, the general message displayed in the hidden message may be moved downward and displayed by a region where the hidden message is displayed.

Advantageous Effects

The method for providing the message hidden service in the chatting window according to the present invention as described above has the following effects.

First, it is possible to select and hide some or all of the chatting texts exchanged therebetween through the chatting application and to improve a privacy protection function of a true user because the hidden messages may be unhidden through personal authentication.

Second, when the user intends to protect a message in a mobile communication terminal, the user may selectively hide the message displayed on the chatting window display the hidden message again through personal authentication, thereby improving a data protection function and user's convenience.

Third, since the message received to the mobile communication terminal is automatically hidden after a predetermined time, the message is easily hidden without being disturbed by the confirmation of the contents of the received message in real time due to the message hidden function, thereby improving not only a data protection function but also user's convenience.

MODES OF THE INVENTION

Other objects, features and advantages of the present invention will be apparent from the detailed description of the embodiments with reference to the accompanying drawings.

A preferred embodiment of a method for providing a message hidden service in a chatting window according to the present invention will be described below with reference to the accompanying drawings. However, the present invention is not limited to embodiments disclosed below but embodied in many different forms, and the present embodiments are merely to be provided to complete the disclosure of the present invention and fully inform the scope of the invention to those skilled in the art. Therefore, the embodiments described in the present specification and the configurations illustrated in the drawings are merely the most preferred embodiment of the present invention and are not intended to represent all of the technical ideas of the present invention, and thus, it should be understood that various equivalents and modifications capable of replacing the embodiments at the time of this application.

Figure 1:
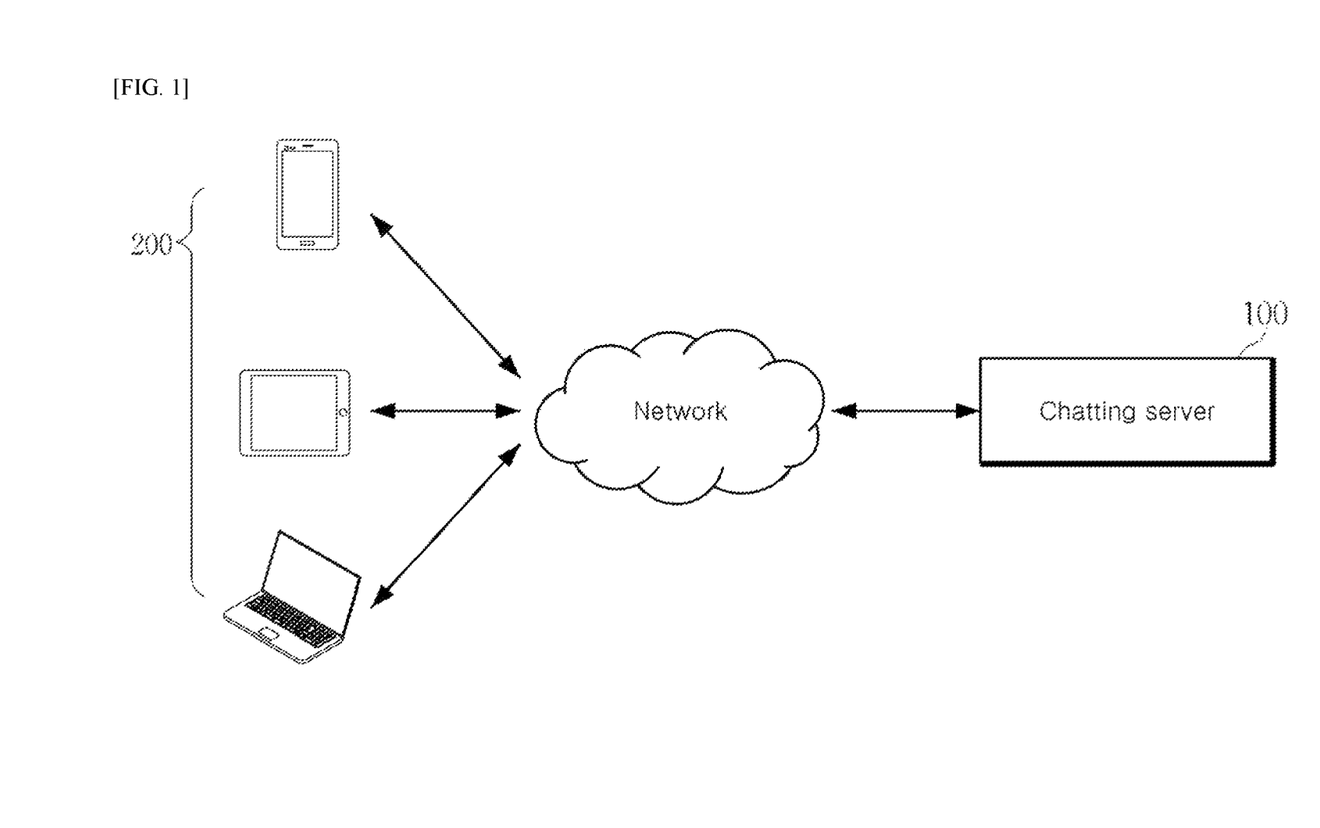
FIG. 1 is a block diagram illustrating a configuration of a apparatus for providing a message hidden service in a chatting window according to an embodiment of the present invention.

FIG. 1 is a block diagram illustrating a configuration of an apparatus for providing a message hidden service in a chatting window according to an embodiment of the present invention.

As shown in FIG. 1, the apparatus for providing a message hidden service of the present invention includes a chatting server 100 and a device 200.

At this time, the chatting server 100 receives chatting data from any one of the plurality of devices 200, and transmits the chatting data received to the other of the plurality of devices 200. At this time, the chatting server 100 may receive the chatting data through the network and transmit the received chatting data. The chatting data includes at least one of text or image data.

The device 200 displays the chatting data received from the chatting server 100 on a display. At this time, the chatting data may be chatting data created by another device. In addition, the device 200 transmits the chatting data input through a user interface to the chatting server 100. At this time, the chatting server 100 may transmit the received chatting data to another device. Generally, the chatting data may include text, image, and sound data, but is not limited to these examples.

According to various embodiments of the present invention, the device 200 may be various types of devices. For example, the device may be a TV device, a computer, or a portable terminal capable of being connected to a remote server via a network. Here, examples of the TV device include a smart TV, an IPTV set-top box, and the like. Examples of the computer include a notebook, a desktop, a laptop, and the like on which a WEB browser is mounted. Examples of the portable terminal may include all types of handheld based wireless communication devices, such as a personal communication system (PCS), a global system for mobile communications (GSM), a personal digital cellular (PDC), personal handyphone system (PHS), personal digital assistant (PDA), international mobile telecommunication (IMT)-2000, code division multiple access (CDMA)-2000, W-code division multiple access (W-CDMA), wireless broadband internet (Wibro) terminal, a smartphone, and a tablet PC, which are wireless communication devices with ensured portability and mobility.

Figure 2:
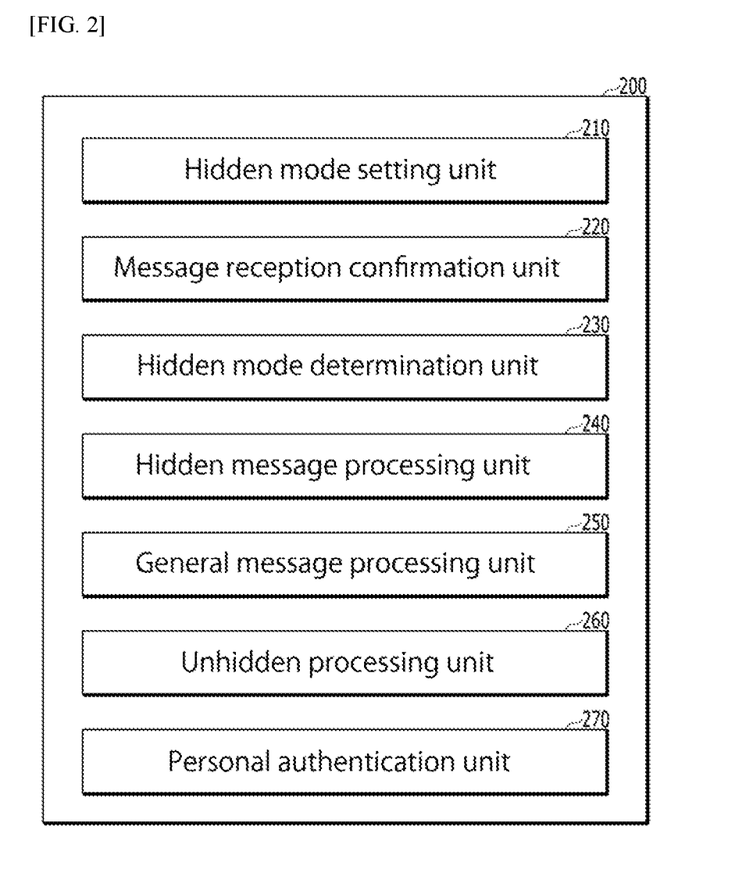
FIG. 2 is a block diagram showing the configuration of the device of FIG. 1 in detail.

FIG. 2 is a block diagram showing the configuration of the device of FIG. 1 in detail.

As shown in FIG. 2, the device 200 includes a hidden mode setting unit 210, a messenger reception confirmation unit 220, a hidden mode determination unit 230, a hidden message processing unit 240, a general message processing unit 250, an unhidden processing unit 260, and a personal authentication unit 270.

The hidden mode setting unit 210 serves to activate or deactivate the message hidden service of the device 200. That is, when receiving a request message for setting or releasing the message hidden service from a message transmitter through a key input unit of the device 200, the hidden mode is set or released.

At this time, the hidden mode setting unit 210 may set or release the hidden mode by authenticating the receiver in response to the request message for setting or releasing the message hidden service from the transmitter. However, the present invention is not limited thereto, and the transmitter may forcibly set the message hidden service setting. That is, if the transmitter sets the message hidden service setting to "forced setting", the receiver may only receive the message "forced setting" transmitted by the transmitter as the hidden message. Accordingly, the message "forced setting" transmitted by the transmitter may be set to be received or not received by the receiver as the hidden message.

The message reception confirmation unit 220 serves to confirm whether a message is received from the chatting server 100 through the network. At this time, when the message is received, the message reception confirmation unit 220 notifies to the hidden mode determination unit 230 that the message has been received.

If the message reception confirmation unit 220 confirms the fact that the message is received, the hidden mode determination unit 230 serves to determine whether the received message is a message set from the transmitter as the hidden message or the received message is set or released as the hidden setting mode from the receiver.

At this time, as the determining result, the hidden mode determination unit 230 instructs the hidden message processing unit 240 to process the received message while the received message is the hidden message (set by the transmitter) and set in the hidden mode (set by the receiver), instructs the general message processing unit 250 to process the received message when the received message is the hidden message and in a hidden mode released state, and instructs the general message processing unit 250 to process the received message regardless of the hidden mode and the hidden mode release mode when the received message is a general message.

At this time, the hidden mode determination unit 230 notifies the transmitter of the state of the received hidden message (whether the receiver performs a hidden process or a general message process) and may directly notify the hidden message/general message or display the state of the received hidden on the display unit of the transmitter by an edge, a text color, blinking, and the like.

The hidden message processing unit 240 proceeds to a hidden message processing procedure according to the instruction of the hidden mode determination unit 230. That is, the chatting server 100 displays the received hidden message on the display unit of the device 200, and deletes the corresponding hidden message displayed on the display unit after a preset predetermined time (seconds, minutes, and hours). Then, the message displayed on the display unit after the hidden message is moved to a position parallel to the deleted position and arranged.

Meanwhile, even when the transmitter transmits the hidden message in the hidden mode set state, the receiver may reject the hidden mode and set receiving to the general message, and in this case, the hidden message processing unit 240 confirms the hidden message from the transmitter to process the confirmed hidden message as the general message to the receiver terminal. However, when the transmitter sets the message hidden service setting to "forced setting", the forced setting message transmitted by the transmitter is not processed as a general message.

The hidden message processing unit 240 is not limited thereto and as another embodiment, displays the hidden message or the unhidden message received from the chatting server 100 on the display unit of the device 200 or displays the hidden message on a separate window of the display unit or a separately independent position from the region of the display unit on which the general message is displayed, and does not display the corresponding hidden message displayed on the display unit after a predetermined time (seconds, minutes, and hours). At this time, the hidden message or the unhidden message is displayed together with the date and time received together with the message.

Accordingly, even if the hidden message or unhidden message is displayed on the separate window or the independent position from the area of the display unit where the general message is displayed, the date and time are displayed together, so that it is not difficult for the user to confirm the corresponding message even though the message is displayed on the separate window or region from the general message.

The general message processing unit 250 proceeds to a general message reception process according to an instruction of the hidden mode determination unit 230. That is, the message received from the chatting server 100 is displayed on the display unit of the device 200 so that the user may confirm and use the received message.

The unhidden processing unit 260 performs a control process when the message is hidden and then unhidden through the hidden message processing procedure in the hidden message processing unit 210. That is, a message to be unhidden is selected from among the hidden messages, and the hidden message is displayed on the display unit by unhiding the selected hidden message. At this time, if the hidden message is displayed on the display unit, the general message displayed in the hidden message is displayed by moving downward by the region where the hidden message is displayed. Here, the message to be unhidden may be selected by a user's touch or the like.

Then, the unhidden processing unit 260 may unhide all of the hidden messages and may also unhide only some of the hidden messages. At this time, when only some of the hidden messages are unhidden, the hidden message is unhidden and displayed by selecting the region where the hidden message is positioned among the messages displayed on the chatting window. Also, when all of the hidden messages are unhidden, the hidden messages of the transmitter all are unhidden and displayed by selecting the transmitter displayed on the upper end of the chatting window.

The personal authentication unit 270 performs personal authentication for performing unhiding in the unhidden processing unit 260. That is, when the unhiding is selected, a personal authentication confirmation window for authenticating the display of the hidden message is displayed on the display unit. In addition, the personal authentication is performed by receiving predetermined unique information on the personal authentication confirmation window by a touch of the user and the like and matching the received unique information with prestored user information. At this time, the unique information includes a password (character), a setting pattern, and biometric information (fingerprint, iris, image matching, etc.).

An operation of the apparatus for providing the message hidden service in the chatting window according to the present invention configured above will be described below in detail with reference to the accompanying drawings. Like reference numerals in FIG. 1 or 2 denote the same members performing the same function.

Figure 3:
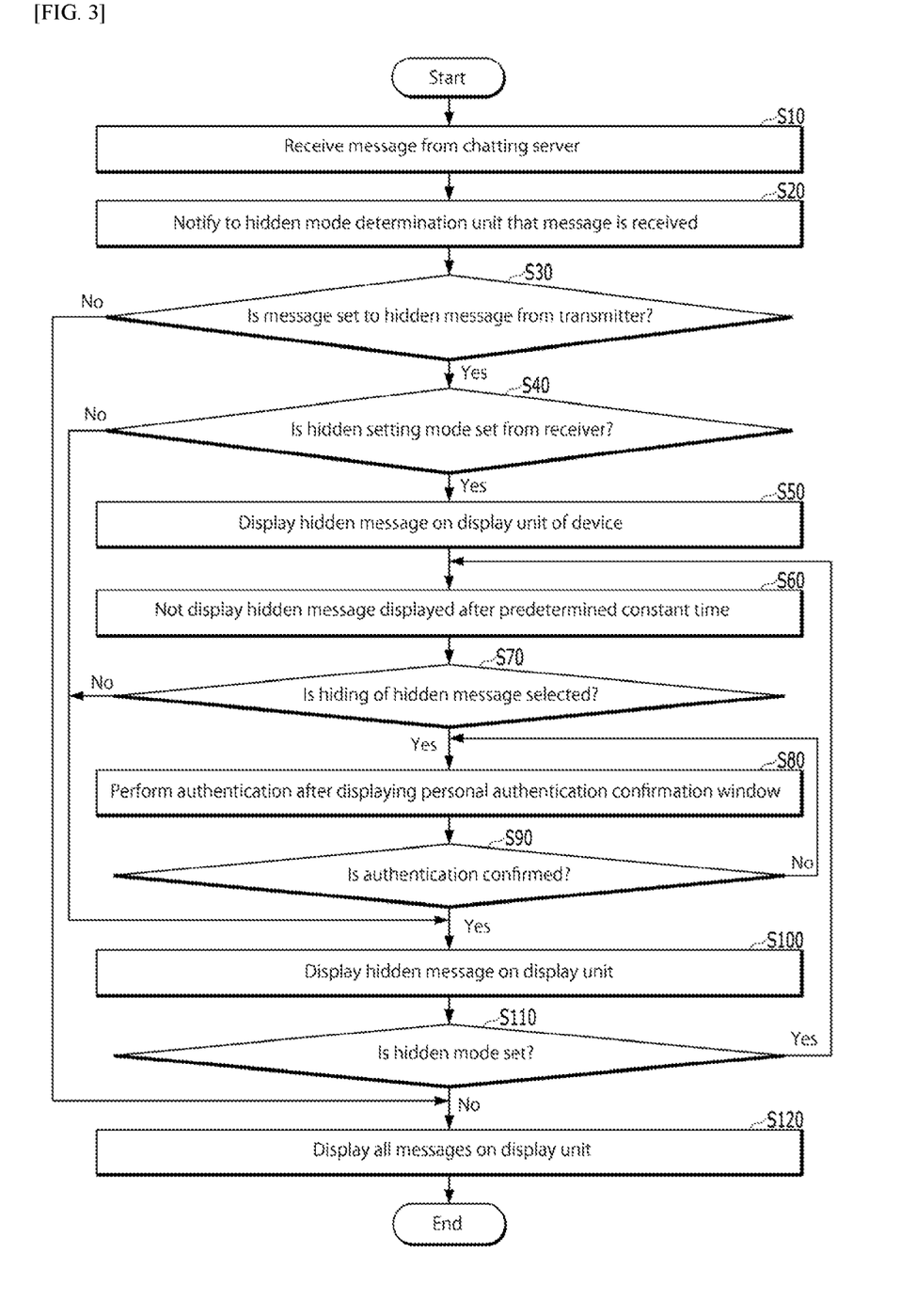
FIG. 3 is a flowchart for describing a method for providing a message hidden service in a chatting window according to another embodiment of the present invention.

FIG. 3 is a flowchart for describing a method for providing a message hidden service in a chatting window according to another embodiment of the present invention.

Referring to FIG. 3, when a message is received from the chatting server 100 through the network (S10), the message reception confirmation unit 220 notifies to the hidden mode determination unit 230 that the message has been received (S20). That is, before the transmitter to transmit the hidden message transmits the hidden message, first, the transmitter transmits the hidden message transmission to the receiver, and the receiver approves the hidden message transmission received from the transmitter, so that the transmission of the hidden message is performed. As another embodiment, when a message is created and then the created message is transmitted to the receiver, selective message transmission is possible through the selection of an option (general/hidden) of a transmission key.

At this time, in order to eliminate inconvenience that the transmitter always confirms and notifies continuously transmitted hidden message and the receiver always confirms and notifies continuously hidden or general messages during chatting, anyone of the transmitter and the receiver performs a collective hiding process until unhiding by receiving a hidden mode setting request continuously during the hidden message request and continuously processing the reception as the hiding. In addition, anyone of the transmitter and the receiver can release the hiding and the continuous hiding without permission of the other party, but the hiding and the continuous hiding may be automatically released after a predetermined time without transmitting or receiving the message.

In addition, the transmission and approval of the hidden message may be performed through the chatting window. When the hidden message transmission is received in the display unit of the receiver terminal, the approval procedure is performed by making a password input window transparent on the display unit so that the user inputs the password by using a keyboard in the general message screen. When the user inputs the password by using the keyboard while the password input window is displayed on the screen, the password inputted is not displayed on the screen.

Accordingly, when the message reception is confirmed, the hidden mode determination unit 230 determines whether the received message is a message set as a hidden message from the transmitter (S30). At this time, a guide message such as "Transmit a hidden message." or "Hidden message has arrived" is necessarily hidden and should not be displayed in the general message.

Subsequently, as the confirming result, if it is confirmed as the hidden message (S30), it is confirmed whether the received message is set as the hidden setting mode from the receiver (S40). That is, in order to process the received message as the hidden message, the message needs to be received as the hidden message from the transmitter, and the received message may be processed as the hidden message only when the received hidden message is set to the hidden setting mode again from the receiver.

However, the present invention is not limited thereto, and the transmitter may forcibly set the message hidden service setting. In this case, even if the receiver does not set the received hidden message to the hidden setting mode again, when the transmitter sets the message hidden service setting to "forced setting", the receiver may receive the "forced setting" message transmitted by the transmitter only as a hidden message, and if the receiver intends not to receive the "forced setting" message as the hidden message, the receiver needs to set the hidden message not to be received.

Figure 4:
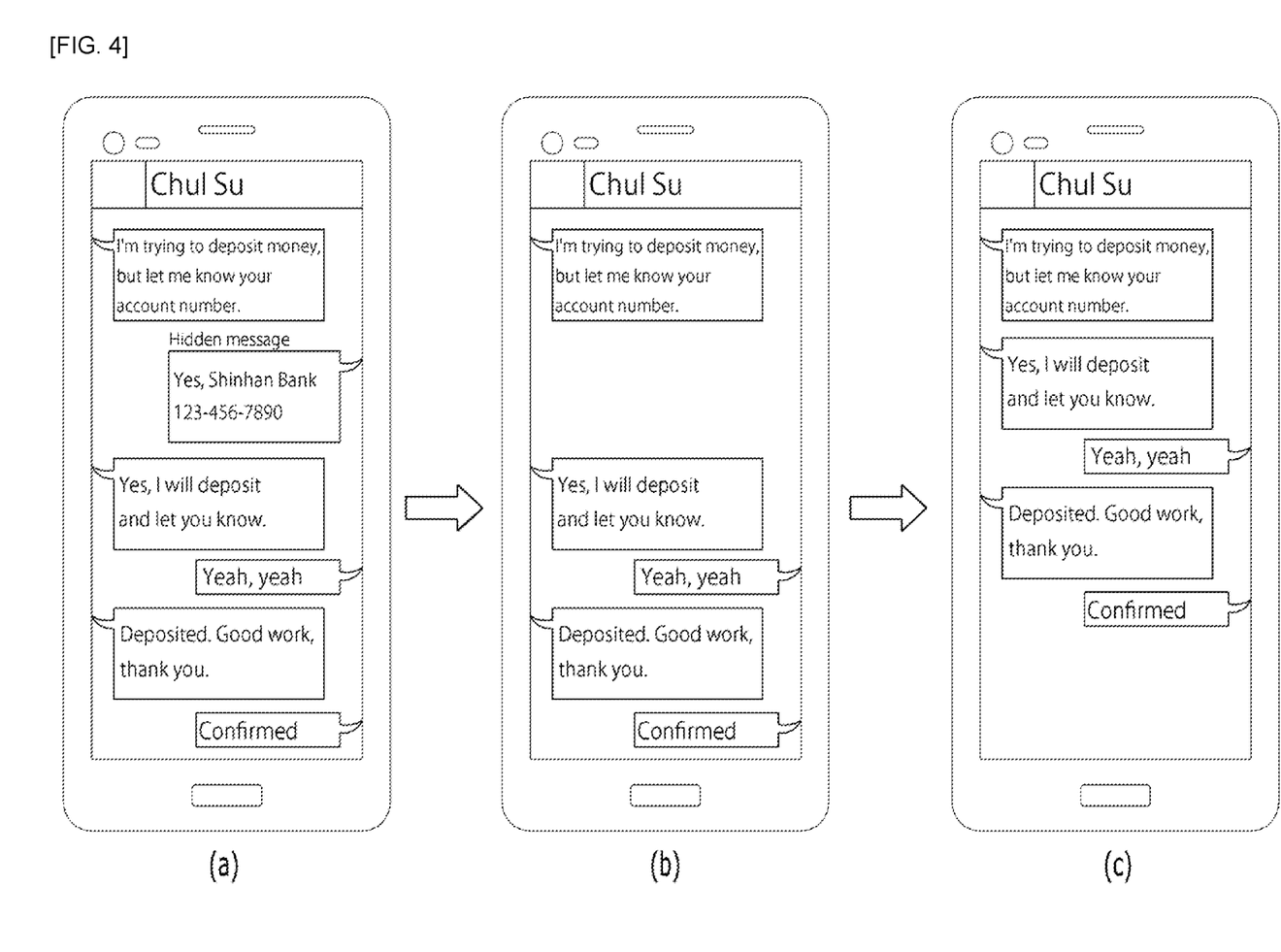
FIG. 4 is a first embodiment for describing a process of hiding a message in FIG. 3.

As such, when the hidden message is set from the transmitter and the hidden setting mode is set from the receiver, as shown in FIG. 4A, the hidden message processing unit 240 displays the received hidden message on the display unit of the device 200 (S50). At this time, it is preferable that the hidden message displayed on the display unit is displayed on the message displayed so that the receiver determines the hidden message. For example, the corresponding message is provided so that the receiver determines the hidden message by providing a mark of "hidden message" on the upper end of the message, providing a highlight on the edge of a speech bubble, filling the inside of the speech bubble with different colors, or providing blinking to the speech bubble.

Subsequently, as shown in FIG. 4B, the hidden message displayed on the display unit is deleted after a predetermined time (second, minute, and hour units) (S60). At this time, the predetermined time is set by the receiver, and once set, all hidden messages are automatically deleted after a predetermined time until the setting is changed.

As shown in FIG. 4C, the message displayed on the display unit after the hidden message is moved to a position parallel to the deleted position of the hidden message and arranged (S70). As such, since the rest of the messages are arranged to be moved to the deleted position of the hidden message, it is not possible to know whether or not there is a hidden message except for the receiver who confirms the message displayed on the display unit from the beginning.

Figure 5:
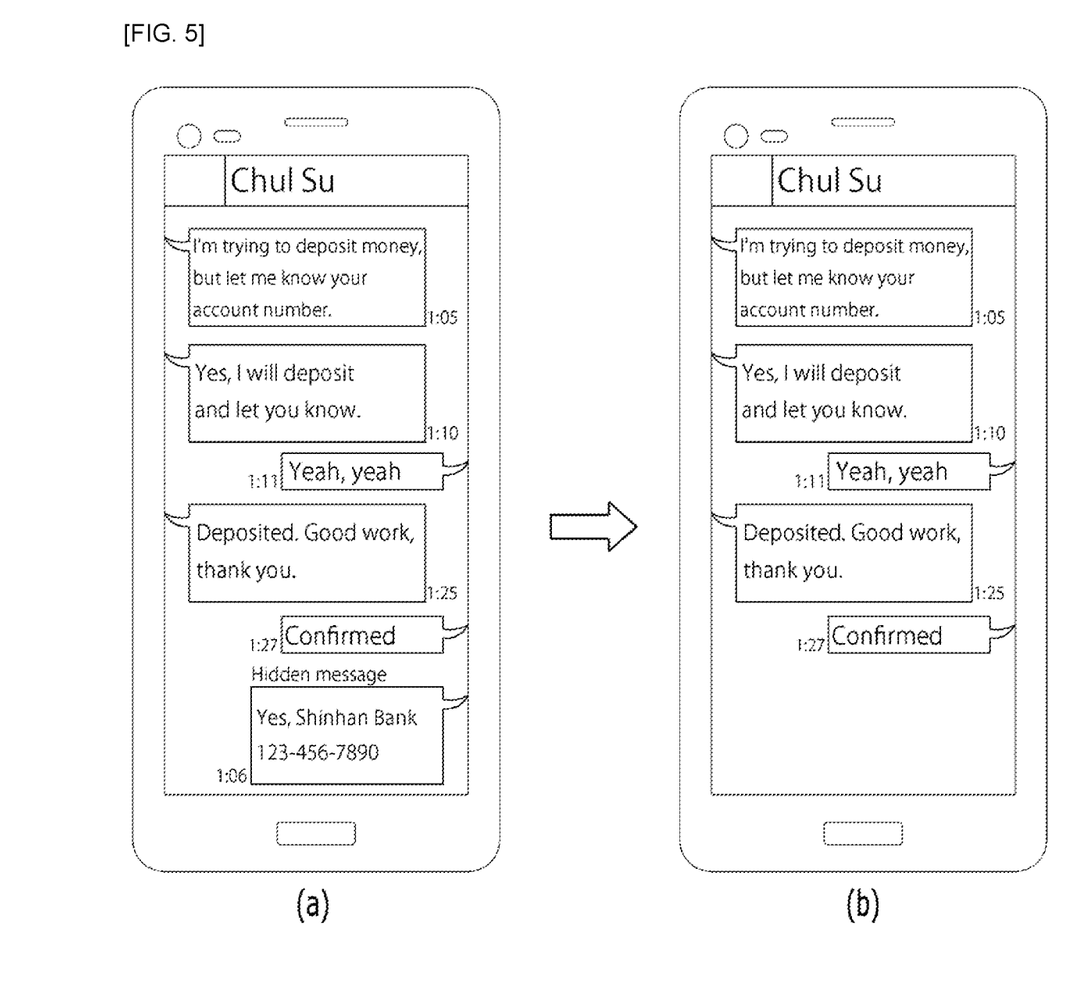
FIG. 5 is a second embodiment for describing a process of hiding a message in FIG. 3.

However, the present invention is not limited thereto, and as another embodiment, when the hidden message is set from the transmitter and the hidden setting mode is set from the receiver, as shown in FIG. 5A, the hidden message processing unit 240 displays the received hidden message on a separate window of the display unit of the device 200 or an independent position separately from the region of the display unit where the general message is displayed (S50). At this time, it is preferable that the hidden message displayed on the display unit is displayed on the message displayed so that the receiver determines the hidden message. For example, the corresponding message is provided so that the receiver determines the hidden message by providing a mark of "hidden message" on the upper end of the message, providing a highlight on the edge of a speech bubble, filling the inside of the speech bubble with different colors, or providing blinking to the speech bubble.

The corresponding hidden message displayed on the display unit is not displayed after the predetermined time (seconds, minutes, and hours). At this time, the hidden message displays the received date and time together with the message.

Subsequently, as shown in FIG. 5B, the hidden message displayed on the display unit is not displayed after a predetermined time (second, minute, and hour units) (S60). At this time, the predetermined time is set by the receiver, and once set, all hidden messages are automatically not displayed after a predetermined time until the setting is changed. Meanwhile, the processing result of the received message may be transmitted to the transmitter terminal.

As such, as the rest of the messages are arranged to be moved to the hidden position of the hidden message, it is not possible to determine whether or not there is a hidden message except for the receiver who confirms the message displayed on the display unit from the beginning.

Meanwhile, when the unhiding of the hidden message is selected from the receiver (S70), the personal authentication unit 270 displays a personal authentication confirmation window for performing the unhiding on the display unit to perform the authentication procedure (S80).

In addition, the personal authentication is performed by receiving predetermined unique information on the personal authentication confirmation window by a touch of the user and the like and matching the received unique information with prestored user information. At this time, the unique information includes a password (character), a setting pattern, and biometric information (fingerprint, iris, image matching, etc.).

However, the authentication procedure is not limited thereto, and as another embodiment, the password input window is made transparent on the display unit so that the user inputs the password using a keyboard on the general message screen. That is, when a screen for receiving the password input is displayed on the display unit, and the user inputs a password, there is a problem in that the surrounding causes curiosity to others and the like. In order to solve this problem, the password input window is made transparent so that the user input the password in the general message screen by using a keyboard, thereby using a method of not knowing the input method other than the user himself. Accordingly, when the user inputs the password by using the keyboard while the password input window is displayed on the screen, the password inputted is not displayed on the screen.

In addition, the personal authentication is performed by receiving predetermined unique information on the personal authentication confirmation window by a touch of the user and the like and matching the received unique information with prestored user information.

On the other hand, in the case of the authentication procedure, when a hidden message is transmitted during waiting other than during chatting, a specific signal of hidden message transmission is transmitted, and at this time, the transmitter is difficult to apply the confirmation of whether the receiver is himself or herself according to the password and has inconvenience of keying in the password every time.

Accordingly, the present invention adds an "identification" function to a menu of the hidden message. The identification is performed by the approval of the other party.

As the identification function, during waiting, the other party takes and transmits a live picture as soon as the other party confirms the hidden message, and the other party can be confirmed by the live confirmation or one snapshot during chatting. Usually, in some cases, the user desires to confirm other party when feeling slight awkwardness during chatting. In this case, it is possible to confirm the other party in real time by performing slight live confirmation (the self-camera is turned on and off for one second during the messaging or a snapshot taking function) through the identification function in agreement with each other. As an option, the user may add a function of "leave or not a single image on the screen or leave it blank", or "face only recognition (no residuals), or "background is confirmed".

As such, in the identification function, a "snapshot" or "live confirmation" function is automatically executed by clicking an approval of other party and opening a camera if "identification" for other party is requested live when the other party is sometimes difficult to be confirmed during chatting. Of course, since the result of this function is automatically stored as hidden content or live, a function of showing the screen and disappearing immediately after confirmation may be added.

If the user authentication is confirmed through the authentication procedure (S90), a message to be unhidden is selected from the hidden messages through the unhiding processing unit 260, and the hidden message is displayed on the display unit by unhiding the selected hidden message (S100).

At this time, if the hidden message is displayed on the display unit, the general message displayed in the hidden message is displayed by moving downward by the region where the hidden message is displayed. However, the present invention is not limited thereto, and as another embodiment, the hidden message is displayed on a separate window of the display unit or an independent position separately from the region of the display unit displayed on which the general message is displayed. Here, the message to be unhidden may be selected by a user's touch or the like.

Then, the unhidden processing unit 260 may unhide all of the hidden messages and may also unhide only some of the hidden messages. At this time, when only some of the hidden messages are unhidden, the hidden message is unhidden and displayed by selecting the region where the hidden message is positioned among the messages displayed on the chatting window. Also, when all of the hidden messages are unhidden, the hidden messages of the transmitter all are unhidden and displayed by selecting the transmitter displayed on the upper end of the chatting window.

When the message displayed on the display unit is set in the hidden setting mode from the receiver again or confirmed as a hidden message (S110), the hidden message displayed after a predetermined time is not displayed (S60), and the process is repeated. As such, even if the hidden setting mode is not set from the receiver again, the hidden message is automatically hidden again and not displayed after a predetermined time. The processing result of the hidden message displayed on the receiver terminal may also be notified to the transmitter terminal together.

As the confirming result (S110), when the hidden setting mode is released, only the general message is displayed on the display unit (S120).

Accordingly, it is possible to select and hide some of the chatting texts exchanged therebetween and to provide a privacy protection function of a true user because the hidden messages may be unhidden through personal authentication.

In addition, since the received message is automatically hidden after a predetermined time, the message may be easily hidden without being disturbed by the confirmation of the contents of the received message in real time due to the message hidden function, thereby increasing not only a data protection function but also user's convenience.

The technical spirit of the present invention described above is described in detail in the preferred embodiments, but it is to be noted that the above embodiments are for the description, not for limitation. It will be understood by those skilled in the art that various embodiments may be made without departing from the technical spirit of the present invention. Therefore, the true scope of the present invention should be determined by the technical spirit of the appended claims.

The invention claimed is:

1. A method for providing a message hidden service in a chatting window comprising:
 (A) confirming whether a received message is a message set as a hidden message from a transmitter when the message is received from a chatting server;
 (B) confirming whether the received message is set in a hidden setting mode from a receiver after the receiver confirms the hidden message set by the transmitter;
 (C) displaying the hidden message on an independent position separately from a region of a display unit of a device by instructing the received message to be processed by a hidden message processing unit when the received message is the hidden message set by the transmitter and set in the hidden setting mode set by the receiver;
 (D) hiding the hidden message displayed on the display unit after a predetermined constant time;
 (E) transmitting a processing result of the received message to the transmitter;
 (F) adding, by the transmitter, an identification function to a menu of the hidden message; and
 (G) by the receiver, taking and transmitting a live picture of the receiver to confirm an identity of the receiver as soon as the receiver confirms the hidden message.

2. The method for providing a message hidden service in a chatting window of claim 1, further comprising:
 performing an authentication procedure by displaying a personal authentication confirmation window for performing unhiding by a personal authentication unit on the display unit when the unhiding of the hidden message is selected from the receiver; and
 selecting a message to be unhidden from the messages which have been hidden by an unhidden processing unit and displaying the hidden message on the display unit by unhiding the selected hidden message when the user authentication is confirmed through the authentication procedure.

3. The method for providing a message hidden service in a chatting window of claim 2, wherein the authentication procedure includes:
 displaying a password input window transparently on the display unit; and
 inputting a password by a user using a keyboard in a general message screen,
 wherein when the user inputs the password by using the keyboard while the password input window is displayed on the screen, the input password is not displayed on the screen.

4. The method for providing a message hidden service in a chatting window of claim 2, wherein when the hidden message is displayed on the display unit, the hidden message is displayed together with a date and a time received together with the message.

5. The method for providing a message hidden service in a chatting window of claim 2, wherein the hidden message to be unhidden is configured by displaying only some of the hidden message on the display unit by unhiding the hidden message at a corresponding position when a region where the hidden message is positioned is selected from the messages displayed on the chatting window, and displaying all of the hidden message on the display unit by unhiding the hidden message of the transmitter when the transmitter displayed on the upper end of the chatting window is selected.

6. The method for providing a message hidden service in a chatting window of claim 1, wherein in step (B), before the transmitter to transmit the hidden message transmits the hidden message, the transmitter first transmits a hidden message transmission to the receiver and the receiver approves the hidden message transmission received from the transmitter.

7. The method for providing a message hidden service in a chatting window of claim 1, wherein in step (C), the hidden message is displayed on a separate window or the independent position separately from the region of the display unit where the received message is displayed.

8. The method for providing a message hidden service in a chatting window of claim 1, wherein step (C) includes receiving a continuous hidden mode setting request when the received message is the hidden message set by the transmitter and processing the hidden message as a continuous hidden message, and collectively hiding the hidden message until at least one of the transmitter and the receiver performs unhiding.

9. The method for providing a message hidden service in a chatting window of claim 1, further comprising:
 forcibly setting, by the transmitter, a message hidden service setting; and
 selecting, by the receiver, the received message forcibly set by the message hidden service setting transmitted by the transmitter to be received as the hidden message or not to be received as the hidden message.

10. The method for providing a message hidden service in a chatting window of claim 1, wherein in step (C), the hidden message displayed on the display unit provides at least one of displaying the hidden message on the upper end of the message so that the receiver determines the hidden message, displaying a highlight on an edge of a speech bubble, displaying the inside of the speech bubble with different colors, and displaying blinking on the speech bubble, and
 when the received message is the hidden message set by the transmitter and the hidden setting mode is not confirmed by the receiver, the hidden message is processed as an unhidden message and the received message is displayed on the display unit of the device as the unhidden message.

11. A method for providing a message hidden service in a chatting window comprising:

(a) confirming whether a received message is a message set as a hidden message from a transmitter when the message is received from a chatting server;

(b) confirming whether the received message is set in a hidden setting mode from a receiver when the receiver confirms the hidden message set by the transmitter;

(c) displaying the hidden message received by a hidden message processing unit on a display unit of a device when the hidden message is set from the transmitter and the hidden setting mode is set from the receiver;

(d) adding, by the transmitter, an identification function to a menu of the hidden message;

(e) by the receiver, taking and transmitting a live picture of the receiver to confirm an identity of the receiver as soon as the receiver confirms the hidden message;

(f) deleting the hidden message displayed on the display unit after a predetermined time; and (g) arranging an unhidden message displayed on the display unit by moving to a position parallel with a position where the hidden message is deleted.

12. The method for providing a message hidden service in a chatting window of claim 11, wherein when the hidden message is displayed on the display unit, the unhidden message in which the hidden message is displayed is moved downward.

13. The method for providing a message hidden service in a chatting window of claim 11, wherein in step (b), when a new message is created and the new message is transmitted to the receiver, a selective message transmission is provided to select between a general option and a hidden option.

* * * * *